United States Patent [19]
Tanaka et al.

[11] Patent Number: 5,903,699
[45] Date of Patent: May 11, 1999

[54] APPARATUS FOR REPRODUCING A SIGNAL FROM A MAGNETIC RECORDING MEDIUM

[75] Inventors: Yutaka Tanaka, Yokosuka; Yutaka Ichinoi, Yokohama, both of Japan

[73] Assignee: Victor Company of Japan, Ltd., Yokohama, Japan

[21] Appl. No.: 08/816,997

[22] Filed: Mar. 14, 1997

[30]     Foreign Application Priority Data

Mar. 18, 1996   [JP]   Japan ................................. 8-090078

[51] Int. Cl.$^6$ ............................................... H04N 5/782
[52] U.S. Cl. ........................... 386/23; 386/39; 386/104; 360/27; 360/64
[58] Field of Search .............................. 386/1, 9, 22, 23, 386/28, 29, 31, 32, 39, 74, 75, 78, 95, 96, 97, 92, 93, 104, 131; 360/27, 69, 64; H04N 5/782

[56]                 References Cited

U.S. PATENT DOCUMENTS

| | | | |
|---|---|---|---|
| 4,656,527 | 4/1987 | Uchimi ........................................ | 386/23 |
| 5,359,463 | 10/1994 | Shirochi et al. ........................... | 386/97 |
| 5,396,372 | 3/1995 | Itoh et al. .................................. | 386/39 |

FOREIGN PATENT DOCUMENTS 61-35082  2/1986  Japan .
6-14723   2/1994  Japan .
6-84107   3/1994  Japan .

*Primary Examiner*—Huy Thanh Nguyen
*Attorney, Agent, or Firm*—Pollock, Vande Sande & Amernick

[57]                   ABSTRACT

A signal reproducing apparatus operates on a magnetic tape on which information is recorded according to one of first, second, and third predetermined recording formats. The signal reproducing apparatus includes first and second heads. The first head reproduces a signal from the magnetic tape, and has a first predetermined azimuth angle. The second head reproduces a signal from the magnetic tape, and has a second predetermined azimuth angle different from the first predetermined azimuth angle. A first detector detects a level of the signal reproduced by the first head. First components are separated from the signal reproduced by the second head. The first components have frequencies in a first predetermined band. A second detector detects a level of the first components. Second components are separated from the signal reproduced by the second head. The second components have frequencies in a second predetermined band separate from the first predetermined band. A third detector detects a level of the second components. A decision is made as to which of the first, second, and third predetermined recording formats the signals reproduced by the first and second heads correspond to in response to the levels detected by the first, second, and third detectors.

10 Claims, 5 Drawing Sheets

APPARATUS FOR REPRODUCING A SIGNAL FROM A MAGNETIC RECORDING MEDIUM

BACKGROUND OF THE INVENTION

1. Field of the Invention

This invention relates to an apparatus for reproducing a signal from a magnetic recording medium such as a magnetic tape.

2. Description of the Related Art

Japanese published examined patent application 6-14723 discloses a method of tracking control in a home-use VTR (video tape recorder). In the method disclosed by Japanese application 6-14723, detection is made as to the presence and the absence of an audio FM signal reproduced via an audio head. In the presence of a reproduced audio FM signal, the tracking error of a rotary head assembly relative to a track on a magnetic tape is detected on the basis of the level of the reproduced audio FM signal. In the absence of a reproduced audio FM signal, the tracking error of the rotary head assembly is detected on the basis of the level of a video FM signal reproduced via a video head. Tracking control is implemented in response to the detected tracking error.

There are plural recording formats used by home-use VTR's. The plural recording formats include first, second, and third recording formats indicated hereafter.

According to the first recording format, an analog video signal is separated into a luminance signal (a Y signal) and a color signal (a C signal). The Y signal is converted by a frequency modulation (FM) process into an FM luminance signal in a frequency band of about 3.4 MHz to 4.4 MHz. The C signal is frequency-down-converted into a signal (a down-converted color signal) in a frequency band under the frequency band assigned to the Y signal. The FM luminance signal and the down-converted color signal are mixed with each other, and the resultant signal mixture is recorded on a magnetic tape via a group of rotary video heads. On the other hand, an audio signal is recorded via an audio head on a linear track extending along an edge of the magnetic tape.

The second recording format is a version extended from the first recording format. The second recording format prescribes audio-signal recording tracks in addition to a linear track. According to the second recording format, 2-channel analog audio signals are converted by frequency modulation (FM) processes into audio FM signals having carrier frequencies of 1.3 MHz and 1.7 MHz respectively. The audio FM signals are recorded on the magnetic tape via a group of rotary audio heads. The rotary audio heads have an azimuth angle considerably different from azimuth angles of the rotary video heads. The rotary audio heads positionally precede the rotary video heads. The rotary audio heads are designed to write the audio FM signals into a deep layer of the magnetic tape on which the rotary video heads can not act. Accordingly, the video signal and the two-channel audio signals are satisfactorily recorded on the magnetic tape.

The third recording format is a version extended from the second recording format. According to the third recording format, 2-channel analog audio signals can be replaced by digital information signals. Thus, digital information signals can be recorded instead of 2-channel analog audio signals.

Japanese published unexamined patent application 6-84107 discloses a video-signal reproducing system. The system of Japanese application 6-84107 includes an analog-signal reproducing head and a digital-signal reproducing head mounted on a same drum. The analog-signal reproducing head is successively followed by an analog-signal reproducing amplifier and an analog-signal processing circuit. The digital-signal reproducing head is successively followed by a digital-signal reproducing amplifier and a digital-signal processing circuit. In the system of Japanese application 6-84107, a sync detector connected to the analog-signal processing circuit decides whether an H-sync signal (or a V-sync signal) in a reproduced analog signal is present or absent. The decision by the sync detector is to detect whether a signal recorded in a magnetic tape is analog or digital. One of the reproduced analog signal and a reproduced digital signal is selected as a final output signal of the system in response to the result of the decision by the sync detector.

There is a known analog/digital VTR using the third recording format. The known analog/digital VTR is able to reproduce signals from a magnetic tape which have been recorded thereon according to any one of the first, second, and third recording formats.

SUMMARY OF THE INVENTION

It is an object of this invention to provide a signal reproducing apparatus which is improved over the method of Japanese application 6-14723 and the system of Japanese application 6-84107 in tracking control during the reproduction of a digital information signal.

A first aspect of this invention provides a signal reproducing apparatus for a magnetic tape on which information is recorded according to one of first, second, and third predetermined recording formats, the apparatus comprising a first head reproducing a signal from the magnetic tape and having a first predetermined azimuth angle; a second head reproducing a signal from the magnetic tape and having a second predetermined azimuth angle different from the first predetermined azimuth angle; first means for detecting a level of the signal reproduced by the first head; second means for separating first components from the signal reproduced by the second head, the first components having frequencies in a first predetermined band; third means for detecting a level of the first components separated by the second means; fourth means for separating second components from the signal reproduced by the second head, the second components having frequencies in a second predetermined band separate from the first predetermined band; fifth means for detecting a level of the second components separated by the fourth means; and sixth means for deciding which of the first, second, and third predetermined recording formats the signals reproduced by the first and second heads correspond to in response to the levels detected by the first means, the third means, and the fifth means.

A second aspect of this invention provides a signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising a first head reproducing a signal from the magnetic tape and having a first predetermined azimuth angle; a second head reproducing a signal from the magnetic tape and having a second predetermined azimuth angle different from the first predetermined azimuth angle; first means for detecting a level of the signal reproduced by the first head; second means for separating components from the signal reproduced by the second head, the separated components having frequencies in a predetermined band; third means for detecting a level of the components separated by the second means; fourth means for detecting whether a digital information signal is present in or absent from the signal reproduced by the second head; and fifth means for deciding which of the first, second, and third predetermined recording formats the signals reproduced by the first and second heads correspond to in response to the levels detected by the first means and the third means, and also in response to a result of detecting by the fourth means.

A third aspect of this invention provides a signal reproducing apparatus for a magnetic tape on which information is recorded according to one of first, second, and third predetermined recording formats, the apparatus comprising a group of first heads each reproducing a signal from the magnetic tape and having a first predetermined azimuth angle; a group of second heads each reproducing a signal from the magnetic tape and having a second predetermined azimuth angle different from the first predetermined azimuth angle; first means for detecting a level of the signals reproduced by the first heads; second means for separating first components from the signals reproduced by the second heads, the first components having frequencies in a first predetermined band; third means for detecting a level of the first components separated by the second means; fourth means for separating second components from the signals reproduced by the second heads, the second components having frequencies in a second predetermined band separate from the first predetermined band; fifth means for detecting a level of the second components separated by the fourth means; sixth means for deciding which of the first, second, and third predetermined recording formats the signals reproduced by the first and second heads correspond to in response to the levels detected by the first means, the third means, and the fifth means; seventh means for implementing automatic tracking control so as to maximize the level detected by the first means when the sixth means decides that the signals reproduced by the first and second heads correspond to the first predetermined recording format; eighth means for implementing automatic tracking control so as to maximize at least one of the level detected by the first means and the level detected by the third means when the sixth means decides that the signals reproduced by the first and second heads correspond to the second predetermined recording format; and ninth means for implementing automatic tracking control so as to maximize the level detected by the fifth means when the sixth means decides that the signals reproduced by the first and second heads correspond to the third predetermined recording format.

A fourth aspect of this invention provides a signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising a group of first heads each reproducing a signal from the magnetic tape and having a first predetermined azimuth angle; a group of second heads each reproducing a signal from the magnetic tape and having a second predetermined azimuth angle different from the first predetermined azimuth angle; first means for detecting a level of the signals reproduced by the first heads; second means for separating first components from the signals reproduced by the second heads, the first components having frequencies in a first predetermined band; third means for detecting a level of the first components separated by the second means; fourth means for separating second components from the signals reproduced by the second heads, the second components having frequencies in a second predetermined band separate from the first predetermined band; fifth means for detecting a level of the second components separated by the fourth means; sixth means for detecting whether an information piece inherent in a digital information signal is present in or absent from the signals reproduced by the second heads; seventh means for deciding which of the first, second, and third predetermined recording formats the signals reproduced by the first and second heads correspond to in response to the levels detected by the first means and the third means, and also in response to a result of detecting by the sixth means; eighth means for implementing automatic tracking control so as to maximize the level detected by the first means when the seventh means decides that the signals reproduced by the first and second heads correspond to the first predetermined recording format; ninth means for implementing automatic tracking control so as to maximize at least one of the level detected by the first means and the level detected by the third means when the seventh means decides that the signals reproduced by the first and second heads correspond to the second predetermined recording format; and tenth means for implementing automatic tracking control so as to maximize the level detected by the fifth means when the seventh means decides that the signals reproduced by the first and second heads correspond to the third predetermined recording format.

A fifth aspect of this invention is based on the fourth aspect thereof, and provides a signal reproducing apparatus wherein the information piece inherent in the digital information signal comprises a sync signal.

A sixth aspect of this invention is based on the fourth aspect thereof, and provides a signal reproducing apparatus wherein the information piece inherent in the digital information signal comprises one of an ID parity signal and an error correction signal.

A seventh aspect of this invention provides a signal reproducing apparatus for a magnetic tape on which information is recorded according to one of first, second, and third predetermined recording formats, the apparatus comprising a group of first heads each reproducing a signal from the magnetic tape and having a first predetermined azimuth angle; a group of second heads each reproducing a signal from the magnetic tape and having a second predetermined azimuth angle different from the first predetermined azimuth angle; first means for detecting a level of the signals reproduced by the first heads; second means for deciding whether or not the level detected by the first means exceeds a first predetermined threshold level; third means for separating first components from the signals reproduced by the second heads, the first components having frequencies in a first predetermined band; fourth means for detecting a level of the first components separated by the third means; fifth means for deciding whether or not the level detected by the fourth means exceeds a second predetermined threshold level; sixth means for separating second components from the signals reproduced by the second heads, the second components having frequencies in a second predetermined band separate from the first predetermined band; seventh means for detecting a level of the second components separated by the sixth means; eighth means for deciding whether or not the level detected by the seventh means exceeds a third predetermined threshold level; ninth means for deciding that the signals reproduced by the first and second heads correspond to the first predetermined recording format when the second means decides that the level detected by the first means exceeds the first predetermined threshold level and the fifth means decides that the level detected by the fourth means does not exceed the second predetermined threshold level; tenth means for deciding that the signals reproduced by the first and second heads correspond to the second predetermined recording format when the second means decides that the level detected by the first means exceeds the first predetermined threshold level and the fifth means decides that the level detected by the fourth means exceeds the second predetermined threshold level; and eleventh means for deciding that the signals reproduced by the first and second heads correspond to the third predetermined recording format when the eighth means decides that the level detected by the seventh means exceeds the third predetermined threshold level.

An eighth aspect of this invention provides a signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising a group of first heads each reproducing a signal from the magnetic tape and having a first predetermined azimuth angle; a group of second heads each reproducing a signal from the magnetic tape and having a second predetermined azimuth angle different from the first predetermined azimuth angle; first means for detecting a level of the signals reproduced by the first heads; second means for deciding whether or not the level detected by the first means exceeds a first predetermined threshold level; third means for separating components from the signals reproduced by the second heads, the separated components having frequencies in a predetermined band; fourth means for detecting a level of the components separated by the third means; fifth means for deciding whether or not the level detected by the fourth means exceeds a second predetermined threshold level; sixth means for detecting whether an information piece inherent in a digital information signal is present in or absent from the signals reproduced by the second heads; seventh means for deciding that the signals reproduced by the first and second heads correspond to the first predetermined recording format when the second means decides that the level detected by the first means exceeds the first predetermined threshold level and the fifth means decides that the level detected by the fourth means does not exceed the second predetermined threshold level; eighth means for deciding that the signals reproduced by the first and second heads correspond to the second predetermined recording format when the second means decides that the level detected by the first means exceeds the first predetermined threshold level and the fifth means decides that the level detected by the fourth means exceeds the second predetermined threshold level; and ninth means for deciding that the signals reproduced by the first and second heads correspond to the third predetermined recording format when the sixth means detects that the information piece inherent in the digital information signal is present.

A ninth aspect of this invention is based on the eighth aspect thereof, and provides a signal reproducing apparatus wherein the information piece inherent in the digital information signal comprises a sync signal.

A tenth aspect of this invention is based on the eighth aspect thereof, and provides a signal reproducing apparatus wherein the information piece inherent in the digital information signal comprises one of an ID parity signal and an error correction signal.

DESCRIPTION OF THE PREFERRED EMBODIMENTS

First Embodiment

A signal reproducing apparatus of a first embodiment of this invention can operate on a magnetic tape on which a signal is recorded according to any one of first, second, and third recording formats indicated hereafter.

According to the first recording format, an analog video signal is separated into a luminance signal (a Y signal) and a color signal (a C signal). The Y signal is converted by a frequency modulation (FM) process into an FM luminance signal in a frequency band of about 3.4 MHz to 4.4 MHz. The C signal is frequency-down-converted into a signal (a down-converted color signal) in a frequency band under the frequency band assigned to the Y signal. The FM luminance signal and the down-converted color signal are mixed with each other, and the resultant signal mixture is recorded on a magnetic tape via a group of rotary video heads. On the other hand, an audio signal is recorded via an audio head on a linear track extending along an edge of the magnetic tape.

The second recording format is a version extended from the first recording format. The second recording format prescribes audio-signal recording tracks in addition to a linear track. According to the second recording format, 2-channel analog audio signals are converted by frequency modulation (FM) processes into audio FM signals having carrier frequencies of 1.3 MHz and 1.7 MHz respectively. The audio FM signals are recorded on the magnetic tape via a group of rotary audio heads. The rotary audio heads have an azimuth angle considerably different from azimuth angles of the rotary video heads. The rotary audio heads positionally precede the rotary video heads. The rotary audio heads are designed to write the audio FM signals into a deep layer of the magnetic tape on which the rotary video heads can not act. Accordingly, the video signal and the two-channel audio signals are satisfactorily recorded on the magnetic tape.

The third recording format is a version extended from the second recording format. According to the third recording format, 2-channel analog audio signals can be replaced by digital information signals. Thus, digital information signals can be recorded instead of 2-channel analog audio signals.

Figure 1:
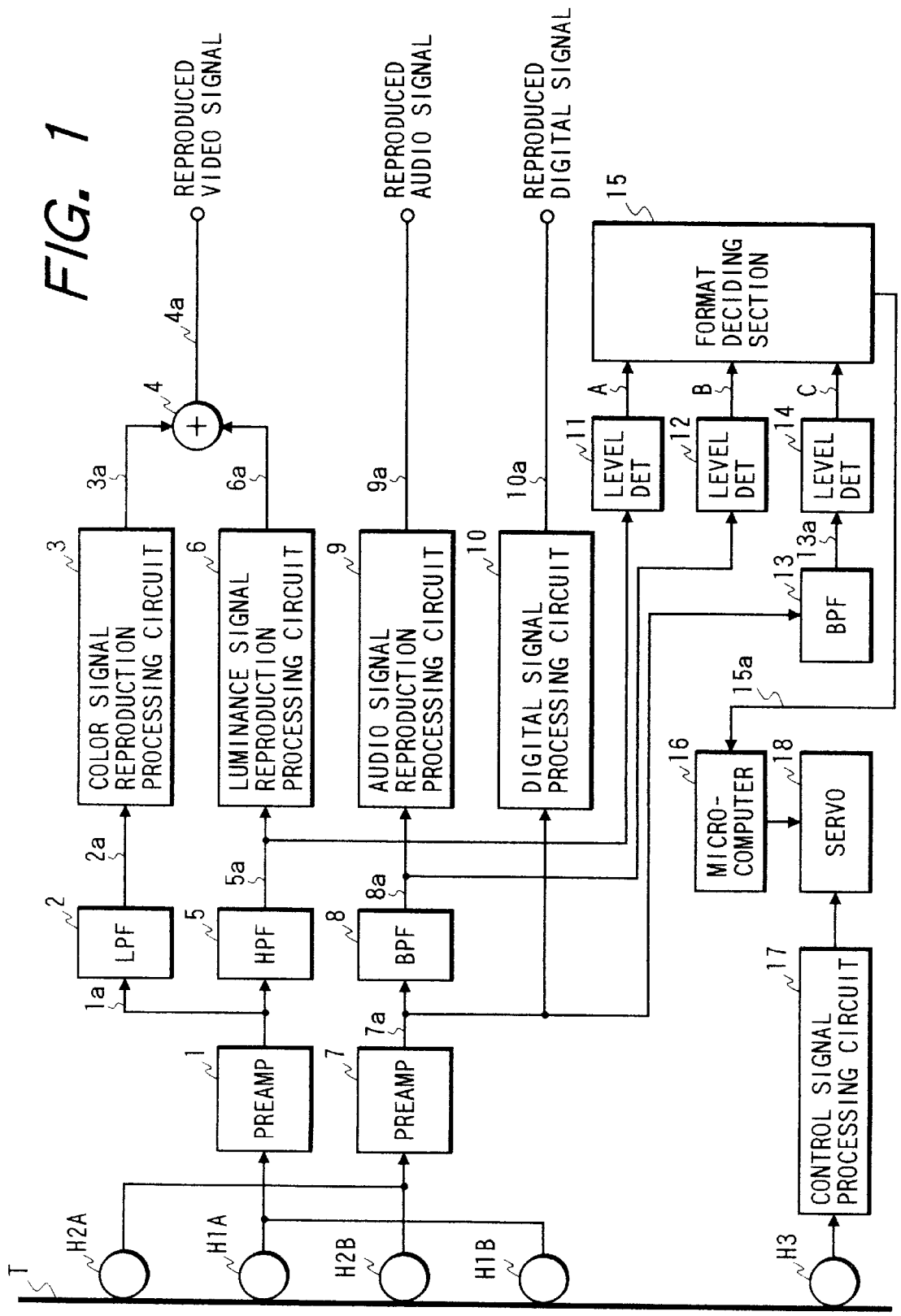
FIG. 1 is a block diagram of a signal reproducing apparatus according to a first embodiment of this invention.

FIG. 1 shows a signal reproducing apparatus according to a first embodiment of this invention. The apparatus of FIG. 1 includes magnetic heads H1A, H1B, H2A, and H2B for reproducing signals from a magnetic tape "T". The magnetic heads H1A, H1B, H2A, and H2B are mounted on a rotary drum. During operation of the apparatus of FIG. 1, the magnetic heads H1A, H1B, H2A, and H2B rotate together with the rotary drum.

Figure 2:
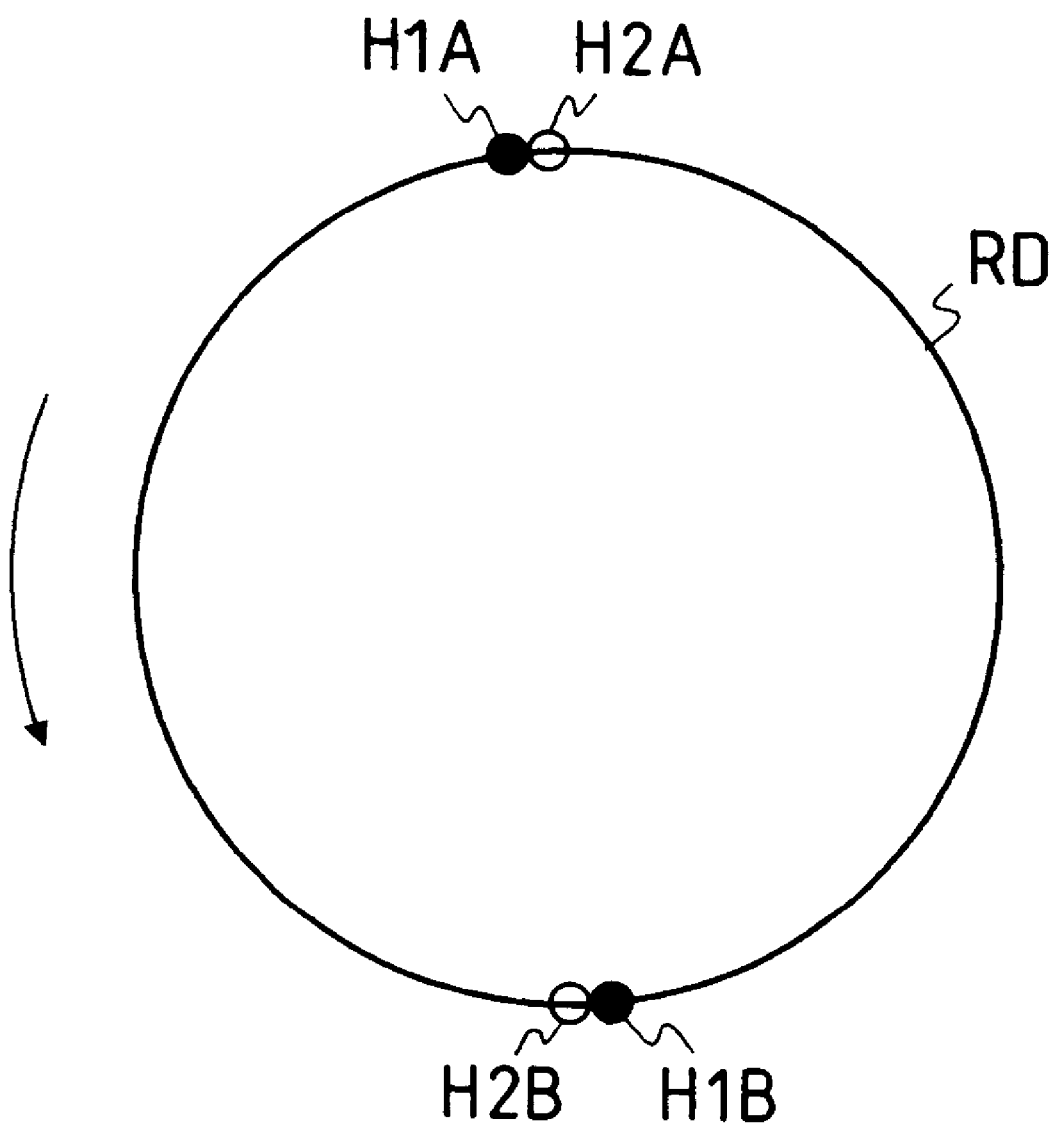
FIG. 2 is a diagrammatic view of a rotary drum and magnetic heads in the apparatus of FIG. 1.

As shown in FIG. 2, the magnetic heads H1A and H2A are positionally close to each other, and form a first pair. The magnetic heads H1B and H2B are positionally close to each other, and form a second pair. The first and second head pairs are fixed to the rotary drum RD at diametrically opposite positions respectively. In general, the first and second head pairs alternately scan the magnetic tape "T". The magnetic heads H1A and H1B have a first predetermined azimuth angle. The magnetic heads H2A and H2B have a second predetermined azimuth angle different from the first predetermined azimuth angle.

It should be noted that one of the magnetic heads H1A and H1B, and one of the magnetic heads H2A and H2B may be omitted.

With reference back to FIG. 1, the magnetic heads H1A and H1B are followed by a preamplifier 1. The magnetic heads H1A and H1B alternately scan the magnetic tape "T", and thereby reproduce a signal therefrom. The signal reproduced by the magnetic heads H1A and H1B is enlarged to a predetermined level by the preamplifier 1. The resultant output signal 1a of the preamplifier 1 is fed to a low pass filter (LPF) 2 and a high pass filter (HPF) 5.

The low pass filter 2 extracts low-frequency components from the output signal 1a of the preamplifier 1 which contain a down-converted color signal. The resultant output signal 2a of the low pass filter 2 is fed to a color signal reproduction processing circuit 3. On the other hand, the high pass filter 5 extracts high-frequency components from the output signal 1a of the preamplifier 1 which contain an FM luminance signal. The resultant output signal 5a of the high pass filter 5 is fed to a luminance signal reproduction processing circuit 6.

The color signal reproduction processing circuit 3 demodulates the output signal 2a of the low pass filter 2 into a color signal 3a. The color signal reproduction processing circuit 3 outputs the color signal 3a to an adder 4. On the other hand, the luminance signal reproduction processing circuit 6 demodulates the output signal 5a of the high pass filter 5 into a luminance signal 6a. The luminance signal reproduction processing circuit 6 outputs the luminance signal 6a to the adder 4. The color signal 3a and the luminance signal 6a are mixed or combined by the adder 4 into a composite video signal 4a. The adder 4 outputs the composite video signal 4a.

The magnetic heads H2A and H2B are followed by a preamplifier 7. The magnetic heads H2A and H2B alternately scan the magnetic tape "T", and thereby reproduce a signal therefrom. The signal reproduced by the magnetic heads H2A and H2B is enlarged to a predetermined level by the preamplifier 7. The resultant output signal 7a of the preamplifier 7 is fed to a band pass filter (BPF) 8.

The band pass filter 8 extracts given-frequency-band components from the output signal 7a of the preamplifier 7 which contain 2-channel audio FM signals. The resultant output signal 8a of the band pass filter 8 is fed to an audio signal reproduction processing circuit 9. The audio signal reproduction processing circuit 9 demodulates the output signal 8a of the band pass filter 8 into 2-channel audio signals 9a. The audio signal reproduction processing circuit 9 outputs the 2-channel audio signals 9a.

The output signal 7a of the preamplifier 7 is also fed to a digital signal processing circuit 10. The digital signal processing circuit 10 demodulates and decodes the output signal 7a of the preamplifier 7 into a digital information signal 10a. The digital signal processing circuit 10 outputs the digital information signal 10a.

The output signal 5a of the high pass filter 5 is also fed to a first level detector 11. An FM signal level (amplitude) of the output signal 5a of the high pass filter 5 is detected by the first level detector 11. The first level detector 11 feeds a format deciding section 15 with a signal "A" depending on the detected FM signal level (amplitude).

The output signal 8a of the band pass filter 8 is also fed to a second level detector 12. An FM signal level (amplitude) of the output signal 8a of the band pass filter 8 is detected by the second level detector 12. The second level detector 12 feeds the format deciding section 15 with a signal "B" depending on the detected FM signal level (amplitude).

The output signal 7a of the preamplifier 7 is also fed to a band pass filter 13. The band pass filter 13 is tuned to a frequency band of a digital information signal which differs from a frequency band of audio FM signals. Accordingly, the band pass filter 13 extracts given-frequency-band components from the output signal 7a of the preamplifier 7 which contain a digital information signal. The resultant output signal 13a of the band pass filter 13 is fed to a third level detector 14. A level (an amplitude) of the output signal 13a of the band pass filter 13 is detected by the third level detector 14. The third level detector 12 feeds the format deciding section 15 with a signal "C" depending on the detected signal level (amplitude).

The format deciding section 15 determines which of the first, second, and third recording formats the currently reproduced signals correspond to by referring to the signals "A", "B", and "C" fed from the first, second, and third level detectors 11, 12, and 14. The format deciding section 15 generates a control signal 15a in response to a result of the determination. The format deciding section 15 outputs the control signal 15a to a microcomputer 16. The microcomputer 16 is programmed to control a drum servo system 18 in response to signals including the control signal 15a.

A magnetic head H3 serves to reproduce a control pulse signal from the magnetic tape "T". The magnetic head H3 is followed by a control signal processing circuit 17. The control signal processing circuit 17 implements phase comparison between a reference pulse signal and the control pulse signal reproduced by the magnetic head H3. The control signal processing circuit 17 outputs a signal, depending on a result of the phase comparison, to the drum servo system 18.

The band pass filter 8 has a predetermined narrow pass band covering carrier frequencies of audio FM signals. On the other hand, the band pass filter 13 has a predetermined pass band which separates from the carrier frequencies of the audio FM signals. The pass band of the band pass filter 13 agrees with a frequency band of a digital information signal. The pass band of the band pass filter 13 extends, for example, from 3 MHz to 10 MHz. As previously explained, the band pass filter 13 extracts the given-frequency-band components from the output signal 7a of the preamplifier 7 which contain a digital information signal.

The signal level detected by the first level detector 11 corresponds to a level (an amplitude) of an FM luminance signal in the output signal 5a of the high pass filter 5. The signal level detected by the second level detector 12 corresponds to a level (an amplitude) of audio FM signals in the output signal 8a of the band pass filter 8. The signal level detected by the third level detector 14 corresponds to a level (an amplitude) of a digital information signal in the output signal 13a of the band pass filter 13.

The first level detector 11 includes a level comparator which compares the detected level of the output signal 5a of the high pass filter 5 with a predetermined threshold level Sa. The threshold level Sa is chosen so that the level comparator can decide whether an FM luminance signal is present in or absent from the output signal 5a of the high pass filter 5. When the level of the output signal 5a of the high pass filter 5 exceeds the threshold level Sa, the level comparator outputs a high-level signal "A" as an indication of the presence of an FM luminance signal. Otherwise, the level comparator outputs a low-level signal "A" as an indication of the absence of an FM luminance signal. The comparator output signal "A" is fed to the format deciding section 15.

The second level detector 12 includes a level comparator which compares the detected level of the output signal 8a of the band pass filter 8 with a predetermined threshold level Sb. The threshold level Sb is chosen so that the level comparator can decide whether audio FM signals are present in or absent from the output signal 8a of the band pass filter 8. When the level of the output signal 8a of the band pass filter 8 exceeds the threshold level Sb, the level comparator outputs a high-level signal "B" as an indication of the presence of audio FM signals. Otherwise, the level comparator outputs a low-level signal "B" as an indication of the absence of audio FM signals. The comparator output signal "B" is fed to the format deciding section 15.

The third level detector 14 includes a level comparator which compares the detected level of the output signal 13a of the band pass filter 13 with a predetermined threshold level Sc. The threshold level Sc is chosen so that the level comparator can decide whether a digital information signal is present in or absent from the output signal 13a of the band pass filter 13. When the level of the output signal 13a of the band pass filter 13 exceeds the threshold level Sc, the level comparator outputs a high-level signal "C" as an indication of the presence of a digital information signal. Otherwise, the level comparator outputs a low-level signal "C" as an indication of the absence of a digital information signal. The comparator output signal "C" is fed to the format deciding section 15.

As previously explained, the format deciding section 15 determines which of the first, second, and third recording formats the currently reproduced signals correspond to by referring to the output signals "A", "B", and "C" of the first, second, and third level detectors 11, 12, and 14. Specifically, when the output signal "A" of the first level detector 11 indicates the presence of an FM luminance signal and the output signal "B" of the second level detector 12 indicates the absence of audio FM signals, the format deciding section 15 decides that the currently reproduced signals correspond to the first recording format. When the output signal "A" of the first level detector 11 indicates the presence of an FM luminance signal and the output signal "B" of the second level detector 12 indicates the presence of audio FM signals, the format deciding section 15 decides that the currently reproduced signals correspond to the second recording format. When the output signal "B" of the second level detector 12 indicates the presence of audio FM signals, the format deciding section 15 may decide that the currently reproduced signals correspond to the second recording format regardless of the state of the output signal "A" of the first level detector 11. When the output signal "C" of the third level detector 14 indicates the presence of a digital information signal, the format deciding section 15 decides that the currently reproduced signals correspond to the third recording format. The format deciding section 15 generates the control signal 15a representing which of the first, second, and third recording formats the currently reproduced signals correspond to. The format deciding section 15 outputs the control signal 15a to the microcomputer 16.

The format deciding section 15 includes, for example, a ROM having storage segments. One of the storage segments is selected and accessed in response to an address signal. A set of the output signals "A", "B", and "C" of the first, second, and third level detectors 11, 12, and 14 is used as the address signal. Predetermined states of the control signal 15a are held in the storage segments respectively. Thus, one of the storage segments is selected and accessed in response to the signals "A", "B", and "C", and a state of the control signal 15a is read out from the accessed storage segment which will form an output signal from the format deciding section 15.

The microcomputer 16 is programmed to implement the following processes. When the control signal 15a represents that the currently reproduced signals correspond to the first recording format, the microcomputer 16 generally controls the drum servo system 18 so that the level (amplitude) of an FM luminance signal will be maximized. To this end, the microcomputer 16 is informed of the level of the FM luminance signal by the level detector 11.

As previously explained, the drum servo system 18 receives the output signal of the control signal processing circuit 17 which depends on the control pulse signal reproduced from the magnetic tape "T" by the magnetic head H3. The drum servo system 18 controls the rotation of the rotary drum RD (see FIG. 2) and the running of the magnetic tape "T" in response to the output signal of the control signal processing circuit 17. Thereby, the drum servo system 18 implements the automatic control of tracking between the magnetic heads (the magnetic heads H1A, H1B, H2A, and H2B) and the tracks on the magnetic tape "T". As the tracking deviates from a normal state, the levels (amplitudes) of signals reproduced by the magnetic heads drop.

At an initial stage of the case where the control signal 15a represents that the currently reproduced signals correspond to the first recording format, the microcomputer 16 controls the drum servo system 18 to slightly change the tracking in an arbitrary direction. Subsequently, the microcomputer 16 checks the state of the control signal 15a. When the microcomputer 16 finds that the control signal 15a remains in the state corresponding to the first recording format, the microcomputer 16 controls the drum servo system 18 to implement tracking suited for the first recording format. On the other hand, when the microcomputer 16 finds that the control signal 15a changes to the state corresponding to the second recording format, the microcomputer 16 controls the drum servo system 18 to implement tracking suited for the second recording format.

When the control signal 15a represents that the currently reproduced signals correspond to the second recording format, the microcomputer 16 generally controls the drum servo system 18 so that the level (amplitude) of audio FM signals will be maximized. To this end, the microcomputer 16 is informed of the level of the audio FM signals by the level detector 12. In this case, the microcomputer 16 may control the drum servo system 18 so that the level (amplitude) of an FM luminance signal and the level (amplitude) of audio FM signals will be sufficient.

At an initial stage of the case where the control signal 15a represents that the currently reproduced signals correspond to the second recording format, the microcomputer 16 controls the drum servo system 18 to slightly change the tracking in an arbitrary direction. Subsequently, the microcomputer 16 checks the state of the control signal 15a. When the microcomputer 16 finds that the control signal 15a remains in the state corresponding to the second recording format, the microcomputer 16 controls the drum servo system 18 to implement tracking suited for the second recording format. On the other hand, when the microcomputer 16 finds that the control signal 15a changes to the state corresponding to the third recording format, the microcomputer 16 controls the drum servo system 18 to implement tracking suited for the third recording format.

When the control signal 15a represents that the currently reproduced signals correspond to the third recording format, the microcomputer 16 controls the drum servo system 18 so that the level (amplitude) of a digital information signal will be maximized. To this end, the microcomputer 16 is informed of the level of the digital information signal by the level detector 14.

Second Embodiment

Figure 3:
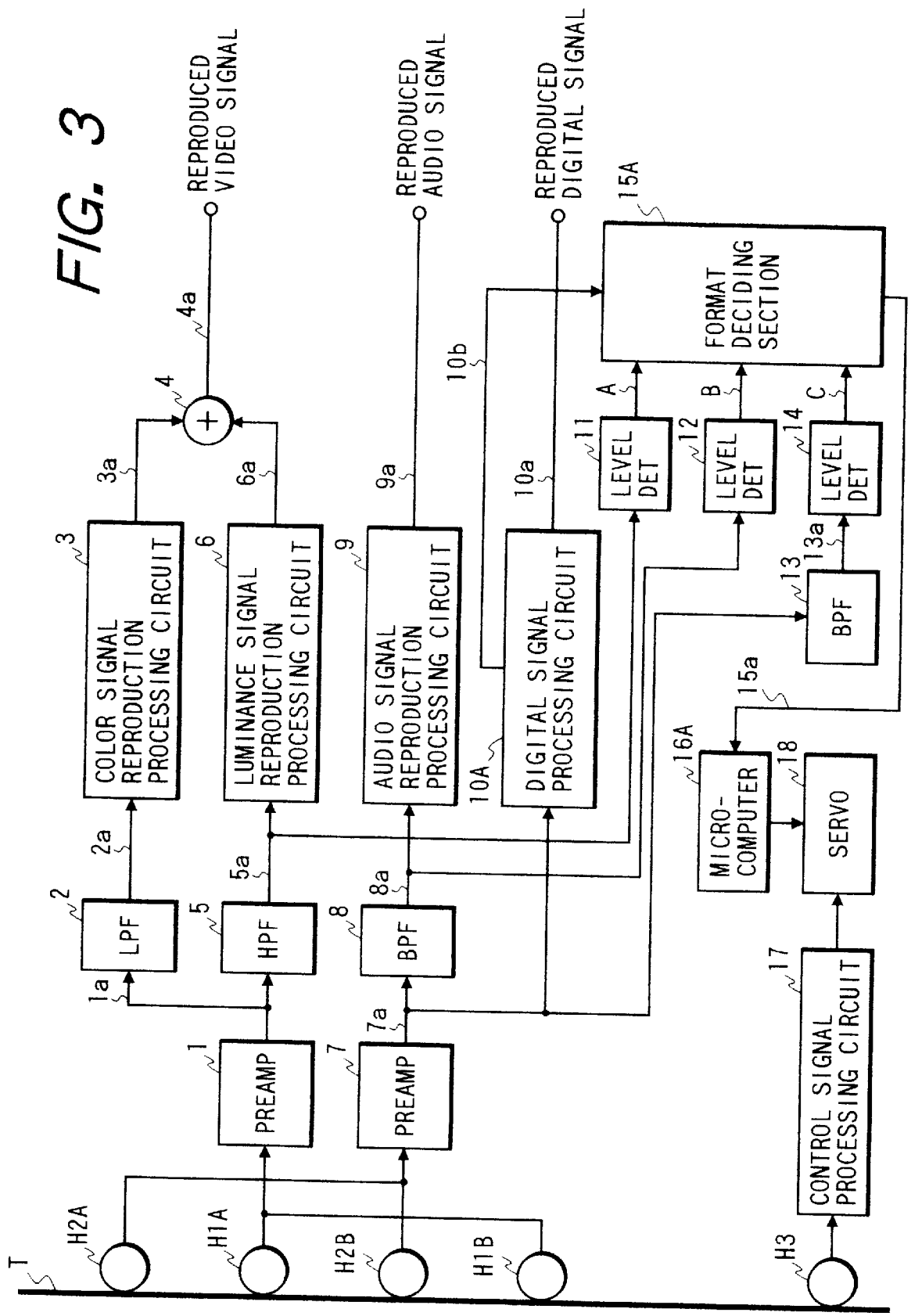
FIG. 3 is a block diagram of a signal reproducing apparatus according to a second embodiment of this invention.

FIG. 3 shows a second embodiment of this invention which is similar to the embodiment of FIG. 1 except for design changes indicated hereafter.

The embodiment of FIG. 3 includes a digital signal processing circuit 10A, a format deciding section 15A, and a microcomputer 16A instead of the digital signal processing circuit 10, the format deciding section 15, and the microcomputer 16 of FIG. 1.

The digital signal processing circuit 10A serves to acquire bit synchronization and byte synchronization related to the reproduction of a digital information signal. The digital signal processing circuit 10A generates a signal 10b representing whether or not both the bit synchronization and the byte synchronization have been successfully acquired. The digital signal processing circuit 10A outputs the signal 10b to the format deciding section 15A.

When the output signal 10b of the digital signal processing circuit 10A represents that both the bit synchronization and the byte synchronization have been acquired, the format deciding section 15A determines that the currently reproduced signals correspond to the third recording format.

The digital signal processing circuit 10A serves to recover a bit sync signal and a byte sync signal from the output signal 7a of the preamplifier 7. When a digital information signal is absent from the output signal 7a of the preamplifier 7, the digital signal processing circuit 10A fails to recover a bit sync signal and a byte sync signal. On the other hand, when a digital information signal is normally present in the output signal 7a of the preamplifier 7, the digital signal processing circuit 10A satisfactorily recovers a bit sync signal and a byte sync signal. It is preferable that the digital signal processing circuit 10A generates the signal 10b by detecting that both the recovered bit sync signal and the recovered byte sync signal are present or absent.

The digital signal processing circuit 10A may generate the signal 10b by detecting the presence and the absence of an ID code signal, an ID parity signal, or an error correction code signal in a digital information signal.

As in the embodiment of FIG. 1, when the control signal 15a outputted from the format deciding section 15A represents that the currently reproduced signals correspond to the third recording format, the microcomputer 16A controls the drum servo system 18 so that the level of the digital information signal will be maximized.

The digital signal processing circuit 10A may inform the microcomputer 16A of conditions of the bit synchronization and the byte synchronization. In this case, when the control signal 15a outputted from the format deciding section 15A represents that the currently reproduced signals correspond to the third recording format, the microcomputer 16A may control the drum servo system 18 in response to the conditions of the byte synchronization and the byte synchronization to implement the automatic control of tracking between the magnetic heads and the tracks on the magnetic tape "T".

The automatic control of tracking may be implemented in response to conditions of a specified component of a digital information signal which are available in the digital signal processing circuit 10A. The specified component of the digital information signal corresponds to, for example, an ID code signal, an ID parity signal, or an error correction code signal.

It should be noted that the band pass filter 13 and the third level detector 14 may be omitted.

Third Embodiment

Figure 4:
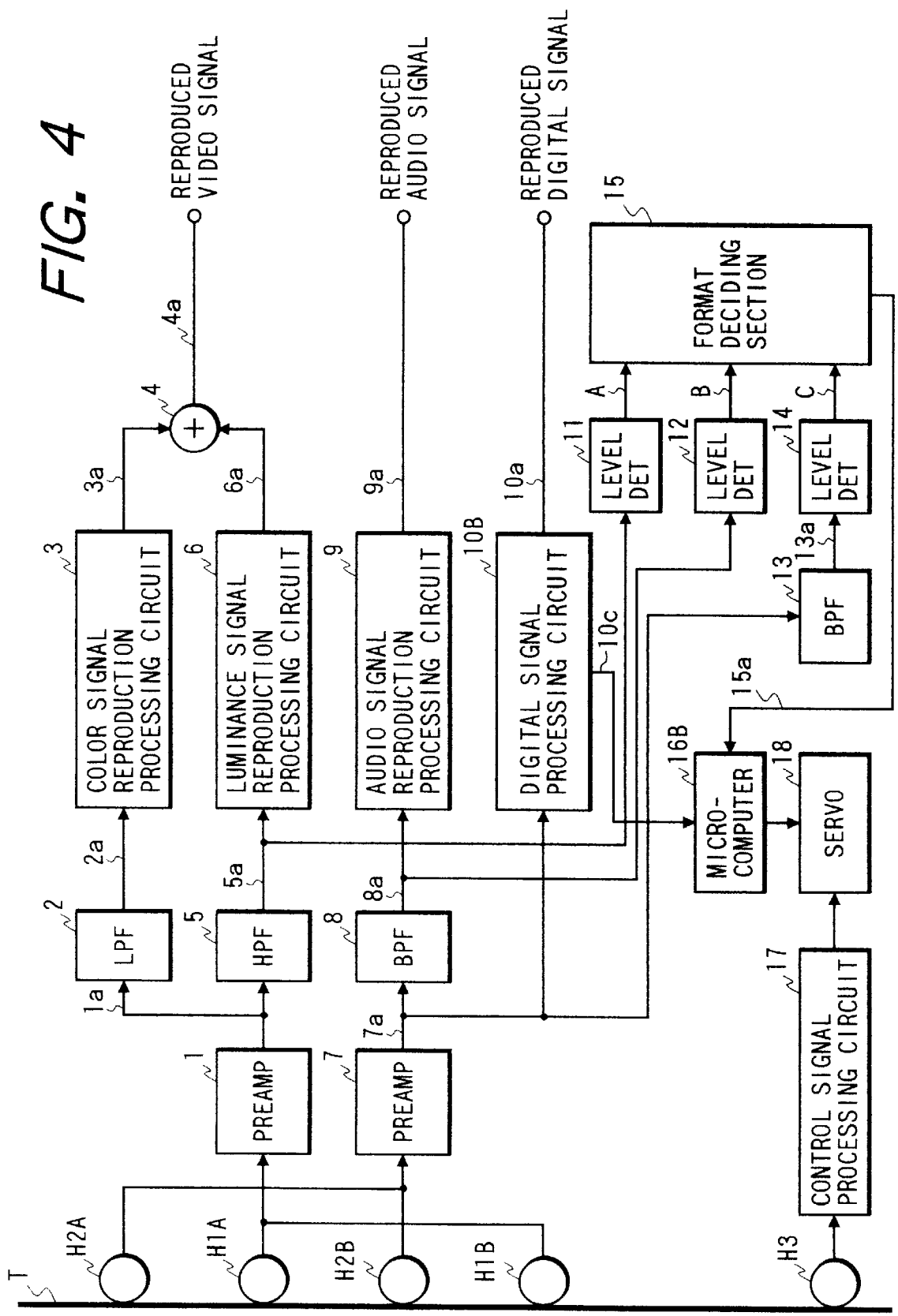
FIG. 4 is a block diagram of a signal reproducing apparatus according to a third embodiment of this invention.

FIG. 4 shows a third embodiment of this invention which is similar to the embodiment of FIG. 1 except for design changes indicated hereafter.

The embodiment of FIG. 4 includes a digital signal processing circuit 10B and a microcomputer 16B instead of the digital signal processing circuit 10 and the microcomputer 16 of FIG. 1.

The digital signal processing circuit 10B subjects a reproduced digital information signal to an error correction process including a step of detecting errors in the reproduced digital information signal. The digital signal processing circuit 10B generates a signal 10c representing the rate of errors in the reproduced digital information signal. The digital signal processing circuit 10B outputs the signal 10c to the microcomputer 16B.

When the control signal 15a outputted from the format deciding section 15 represents that the currently reproduced signals correspond to the third recording format, the microcomputer 16B controls the drum servo system 18 so that the error rate indicated by the output signal 10c of the digital signal processing circuit 10B will be minimized.

Fourth Embodiment

Figure 5:
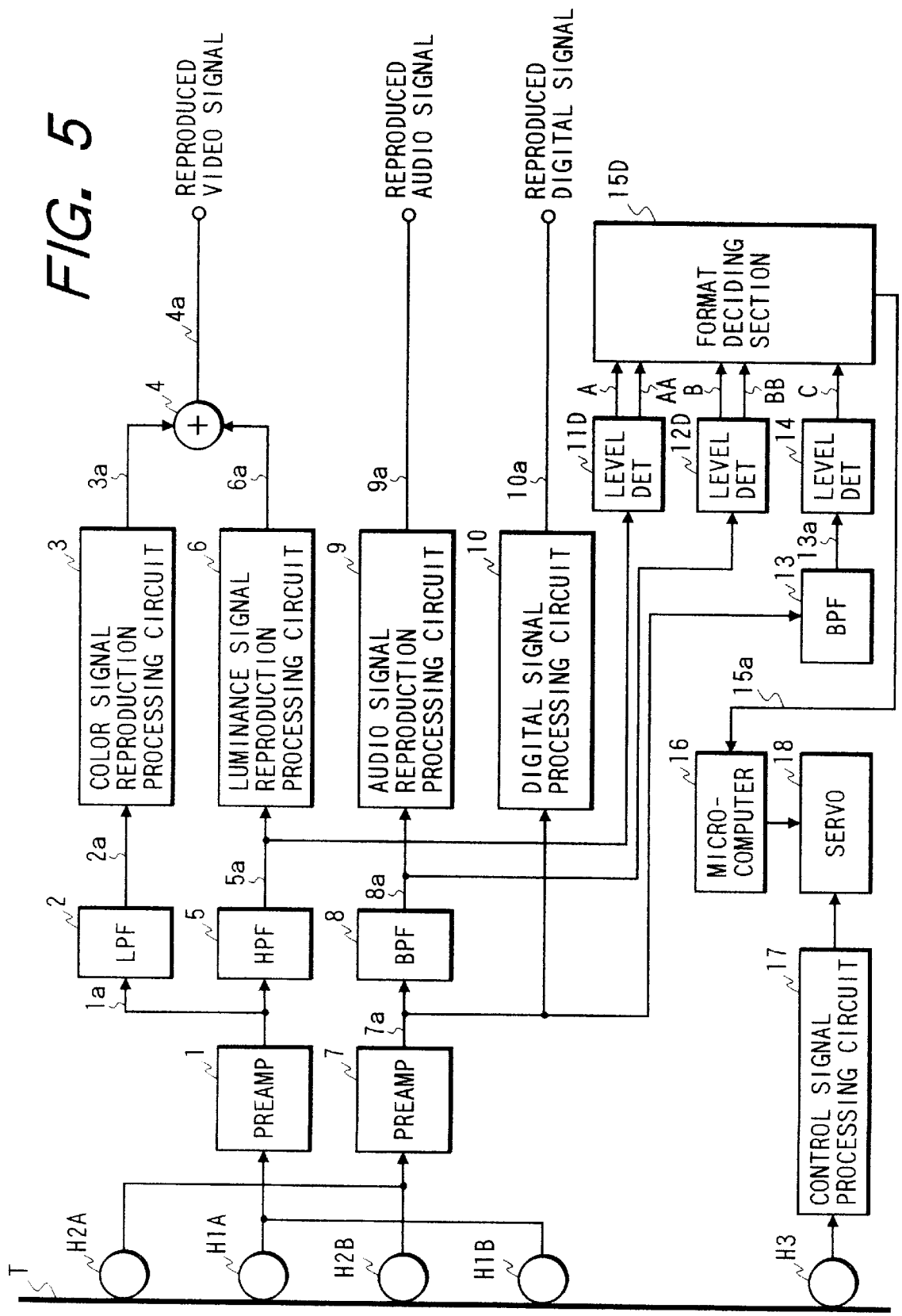
FIG. 5 is a block diagram of a signal reproducing apparatus according to a fourth embodiment of this invention.

FIG. 5 shows a fourth embodiment of this invention which is similar to the embodiment of FIG. 1 except for design changes indicated hereafter.

The embodiment of FIG. 5 includes a first level detector 11D, a second level detector 12D, and a format deciding section 15D instead of the first level detector 11, the second level detector 12, and the format deciding section 15 of FIG. 1.

The first level detector 11D includes a first level comparator which compares the detected level of the output signal 5a of the high pass filter 5 with a predetermined threshold level Sa. The threshold level Sa is chosen so that the first level comparator can decide whether an FM luminance signal is present in or absent from the output signal 5a of the high pass filter 5. When the level of the output signal 5a of the high pass filter 5 exceeds the threshold level Sa, the first level comparator outputs a high-level signal "A" as an indication of the presence of an FM luminance signal. Otherwise, the first level comparator outputs a low-level signal "A" as an indication of the absence of an FM luminance signal. The comparator output signal "A" is fed to the format deciding section 15D.

The second level detector 12D includes a first level comparator which compares the detected level of the output signal 8a of the band pass filter 8 with a predetermined threshold level Sb. The threshold level Sb is chosen so that the first level comparator can decide whether audio FM signals are present in or absent from the output signal 8a of the band pass filter 8. When the level of the output signal 8a of the band pass filter 8 exceeds the threshold level Sb, the first level comparator outputs a high-level signal "B" as an indication of the presence of audio FM signals. Otherwise, the first level comparator outputs a low-level signal "B" as an indication of the absence of audio FM signals. The comparator output signal "B" is fed to the format deciding section 15D.

Generally, in a frequency domain, a digital information signal spreads over a frequency band of an FM luminance signal and also a frequency band of audio FM signals. Components of the digital information signal in the frequency band of the FM luminance signal and the frequency band of the audio FM signals correspond to only a small part of the digital information signal. Accordingly, if the output signal 5a of the high pass filter 5 has only digital information, the level (amplitude) of the output signal 5a of the high pass filter 5 is relatively low. If the output signal 8a of the band pass filter 8 has only digital information, the level (amplitude) of the output signal 8a of the band pass filter 8 is relatively low. By using these facts, each of the first and second level detectors 11D and 12D decides the presence of a digital information signal.

Specifically, the first level detector 11D includes a second level comparator which compares the level of the output signal 5a of the high pass filter 5 with a predetermined threshold level Saa. The threshold level Saa is chosen so that the second level comparator can decide whether or not only a digital information signal is present in the output signal 5a of the high pass filter 5. Generally, the threshold level Saa is lower than the threshold level Sa. When the level of the output signal 5a of the high pass filter 5 is lower than the threshold level Saa, the second level comparator outputs a high-level signal "AA" as an indication of the presence of only a digital information signal. Otherwise, the second level comparator outputs a low-level signal "AA". The comparator output signal "AA" is fed to the format deciding section 15D.

The second level detector 12D includes a second level comparator which compares the level of the output signal 8a of the band pass filter 8 with a predetermined threshold level Sbb. The threshold level Sbb is chosen so that the second level comparator can decide whether or not only a digital information signal is present in the output signal 8a of the band pass filter 8. Generally, the threshold level Sbb is lower than the threshold level Sb. When the level of the output signal 8a of the band pass filter 8 is lower than the threshold level Sbb, the second level comparator outputs a high-level signal "BB" as an indication of the presence of only a digital information signal. Otherwise, the second level comparator outputs a low-level signal "BB". The comparator output signal "BB" is fed to the format deciding section 15D.

The format deciding section 15D determines which of the first, second, and third recording formats the currently reproduced signals correspond to by referring to the output signals "A", "AA", "B", "BB", and "C" of the first, second, and third level detectors 11D, 12D, and 14. Specifically, when the output signal "A" of the first level detector 11D indicates the presence of an FM luminance signal and the output signal "B" of the second level detector 12D indicates the absence of audio FM signals, the format deciding section 15D decides that the currently reproduced signals correspond to the first recording format. When the output signal "A" of the first level detector 11D indicates the presence of an FM luminance signal and the output signal "B" of the second level detector 12D indicates the presence of audio FM signals, the format deciding section 15D decides that the currently reproduced signals correspond to the second recording format. When the output signal "B" of the second level detector 12D indicates the presence of audio FM signals, the format deciding section 15D may decide that the currently reproduced signals correspond to the second recording format regardless of the state of the output signal "A" of the first level detector 11D. When the output signal "AA" of the first level detector 11D, the output signal "BB" of the second level detector 12D, and the output signal "C" of the third level detector 14 indicate the presence of a digital information signal, the format deciding section 15D decides that the currently reproduced signals correspond to the third recording format. The format deciding section 15D generates the control signal 15a representing which of the first, second, and third recording formats the currently reproduced signals correspond to. The format deciding section 15D outputs the control signal 15a to the microcomputer 16.

What is claimed is:

1. A signal reproducing apparatus for a magnetic tape on which information is recorded according to one of first, second, and third predetermined recording formats, the apparatus comprising:

a first head reproducing a signal from the magnetic tape and having a first predetermined azimuth angle;

a second head reproducing a signal from the magnetic tape and having a second predetermined azimuth angle different from the first predetermined azimuth angle;

first means for detecting a level of the signal reproduced by the first head;

second means for separating first components from the signal reproduced by the second head, the first components having frequencies in a first predetermined band;

third means for detecting a level of the first components separated by the second means;

fourth means for separating second components from the signal reproduced by the second head, the second components having frequencies in a second predetermined band separate from the first predetermined band;

fifth means for detecting a level of the second components separated by the fourth means; and sixth means for deciding which of the first, second, and third predetermined recording formats the signals reproduced by the first and second heads correspond to in response to the levels detected by the first means, the third means, and the fifth means.

2. A signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising:

a first head reproducing a signal from the magnetic tape and having a first predetermined azimuth angle;

a second head reproducing a signal from the magnetic tape and having a second predetermined azimuth angle different from the first predetermined azimuth angle;

first means for detecting a level of the signal reproduced by the first head;

second means for separating components from the signal reproduced by the second head, the separated components having frequencies in a predetermined band;

third means for detecting a level of the components separated by the second means:

fourth means for detecting whether a digital information signal is present in or absent from the signal reproduced by the second head; and fifth means for deciding which of the first, second, and third predetermined recording formats the signals reproduced by the first and second heads correspond to in response to the levels detected by the first means and the third means, and also in response to a result of detecting by the fourth means.

3. A signal reproducing apparatus for a magnetic tape on which information is recorded according to one of first, second, and third predetermined recording formats, the apparatus comprising:

a group of first heads each reproducing a signal from the magnetic tape and having a first predetermined azimuth angle;

a group of second heads each reproducing a signal from the magnetic tape and having a second predetermined azimuth angle different from the first predetermined azimuth angle;

first means for detecting a level of the signals reproduced by the first heads;

second means for separating first components from the signals reproduced by the second heads, the first components having frequencies in a first predetermined band;

third means for detecting a level of the first components separated by the second means;

fourth means for separating second components from the signals reproduced by the second heads, the second components having frequencies in a second predetermined band separate from the first predetermined band;

fifth means for detecting a level of the second components separated by the fourth means;

sixth means for deciding which of the first, second, and third predetermined recording formats the signals reproduced by the first and second heads correspond to in response to the levels detected by the first means, the third means, and the fifth means;

seventh means for implementing automatic tracking control so as to maximize the level detected by the first means when the sixth means decides that the signals reproduced by the first and second heads correspond to the first predetermined recording format;

eighth means for implementing automatic tracking control so as to maximize at least one of the level detected by the first means and the level detected by the third means when the sixth means decides that the signals reproduced by the first and second heads correspond to the second predetermined recording format; and ninth means for implementing automatic tracking control so as to maximize the level detected by the fifth means when the sixth means decides that the signals reproduced by the first and second heads correspond to the third predetermined recording format.

4. A signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising:

a group of first heads each reproducing a signal from the magnetic tape and having a first predetermined azimuth angle;

a group of second heads each reproducing a signal from the magnetic tape and having a second predetermined azimuth angle different from the first predetermined azimuth angle;

first means for detecting a level of the signals reproduced by the first heads;

second means for separating first components from the signals reproduced by the second heads, the first components having frequencies in a first predetermined band;

third means for detecting a level of the first components separated by the second means;

fourth means for separating second components from the signals reproduced by the second heads, the second components having frequencies in a second predetermined band separate from the first predetermined band;

fifth means for detecting a level of the second components separated by the fourth means;

sixth means for detecting whether an information piece inherent in a digital information signal is present in or absent from the signals reproduced by the second heads;

seventh means for deciding which of the first, second, and third predetermined recording formats the signals reproduced by the first and second heads correspond to in response to the levels detected by the first means and the third means, and also in response to a result of detecting by the sixth means;

eighth means for implementing automatic tracking control so as to maximize the level detected by the first means when the seventh means decides that the signals reproduced by the first and second heads correspond to the first predetermined recording format;

ninth means for implementing automatic tracking control so as to maximize at least one of the level detected by the first means and the level detected by the third means when the seventh means decides that the signals reproduced by the first and second heads correspond to the second predetermined recording format; and tenth means for implementing automatic tracking control so as to maximize the level detected by the fifth means when the seventh means decides that the signals reproduced by the first and second heads correspond to the third predetermined recording format.

5. A signal reproducing apparatus as recited in claim 4, wherein the information piece inherent in the digital information signal comprises a sync signal.

6. A signal reproducing apparatus as recited in claim 4, wherein the information piece inherent in the digital information signal comprises one of an ID parity signal and an error correction signal.

7. A signal reproducing apparatus for a magnetic tape on which information is recorded according to one of first, second, and third predetermined recording formats, the apparatus comprising:

a group of first heads each reproducing a signal from the magnetic tape and having a first predetermined azimuth angle;

a group of second heads each reproducing a signal from the magnetic tape and having a second predetermined azimuth angle different from the first predetermined azimuth angle;

first means for detecting a level of the signals reproduced by the first heads;

second means for deciding whether or not the level detected by the first means exceeds a first predetermined threshold level;

third means for separating first components from the signals reproduced by the second heads, the first components having frequencies in a first predetermined band;

fourth means for detecting a level of the first components separated by the third means;

fifth means for deciding whether or not the level detected by the fourth means exceeds a second predetermined threshold level;

sixth means for separating second components from the signals reproduced by the second heads, the second components having frequencies in a second predetermined band separate from the first predetermined band;

seventh means for detecting a level of the second components separated by the sixth means;

eighth means for deciding whether or not the level detected by the seventh means exceeds a third predetermined threshold level;

ninth means for deciding that the signals reproduced by the first and second heads correspond to the first predetermined recording format when the second means decides that the level detected by the first means exceeds the first predetermined threshold level and the fifth means decides that the level detected by the fourth means does not exceed the second predetermined threshold level;

tenth means for deciding that the signals reproduced by the first and second heads correspond to the second predetermined recording format when the second means decides that the level detected by the first means exceeds the first predetermined threshold level and the fifth means decides that the level detected by the fourth means exceeds the second predetermined threshold level; and eleventh means for deciding that the signals reproduced by the first and second heads correspond to the third predetermined recording format when the eighth means decides that the level detected by the seventh means exceeds the third predetermined threshold level.

8. A signal reproducing apparatus for a magnetic tape on which information is recorded according to one of first, second, and third predetermined recording formats, wherein information recorded according to the first predetermined recording format or the second predetermined recording format is exclusive of a digital signal, and information recorded according to the third predetermined recording format contains a digital signal, the apparatus comprising:

a group of first heads each reproducing a signal from the magnetic tape and having a first predetermined azimuth angle;

a group of second heads each reproducing a signal from the magnetic tape and having a second predetermined azimuth angle different from the first predetermined azimuth angle;

first means for detecting a level of the signals reproduced by the first heads;

second means for deciding whether or not the level detected by the first means exceeds a first predetermined threshold level;

third means for separating components from the signals reproduced by the second heads, the separated components having frequencies in a predetermined band;

fourth means for detecting a level of the components separated by the third means;

fifth means for deciding whether or not the level detected by the fourth means exceeds a second predetermined threshold level;

sixth means for detecting whether an information piece inherent in a digital information signal is present in or absent from the signals reproduced by the second heads;

seventh means for deciding that the signals reproduced by the first and second heads correspond to the first predetermined recording format when the second means decides that the level detected by the first means exceeds the first predetermined threshold level and the fifth means decides that the level detected by the fourth means does not exceed the second predetermined threshold level;

eighth means for deciding that the signals reproduced by the first and second heads correspond to the second predetermined recording format when the second means decides that the level detected by the first means exceeds the first predetermined threshold level and the fifth means decides that the level detected by the fourth means exceeds the second predetermined threshold level; and ninth means for deciding that the signals reproduced by the first and second heads correspond to the third predetermined recording format when the sixth means detects that the information piece inherent in the digital information signal is present.

9. A signal reproducing apparatus as recited in claim 8, wherein the information piece inherent in the digital information signal comprises a sync signal.

10. A signal reproducing apparatus as recited in claim 8, wherein the information piece inherent in the digital information signal comprises one of an ID parity signal and an error correction signal.

* * * * *